(12) United States Patent
Lasserre et al.

(10) Patent No.: US 11,051,024 B1
(45) Date of Patent: Jun. 29, 2021

(54) METHODS AND DEVICES FOR PREDICTIVE CODING OF POINT CLOUDS

(71) Applicant: BlackBerry Limited, Waterloo (CA)

(72) Inventors: Sébastien Lasserre, Thorigné-Fouillard (FR); David Flynn, Darmstadt (DE)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/045,782

(22) PCT Filed: Apr. 3, 2019

(86) PCT No.: PCT/CA2019/050400
§ 371 (c)(1),
(2) Date: Oct. 7, 2020

(87) PCT Pub. No.: WO2019/195921
PCT Pub. Date: Oct. 17, 2019

(30) Foreign Application Priority Data

Apr. 9, 2018 (EP) .................................. 18305416

(51) Int. Cl.
*H04N 19/147* (2014.01)
*H04N 19/91* (2014.01)
(Continued)

(52) U.S. Cl.
CPC ......... *H04N 19/147* (2014.11); *H04N 19/105* (2014.11); *H04N 19/517* (2014.11); *H04N 19/567* (2014.11); *H04N 19/91* (2014.11)

(58) Field of Classification Search
CPC .. H04N 19/147; H04N 19/105; H04N 19/517; H04N 19/567; H04N 19/91
(Continued)

(56) References Cited

U.S. PATENT DOCUMENTS

2012/0147961 A1*  6/2012  Guo ..................... H04N 19/147
                                                    375/240.16
2017/0021494 A1   7/2017  Cohen et al.
(Continued)

FOREIGN PATENT DOCUMENTS

CN      104715496 A     6/2015
WO      WO2013117001    8/2013

OTHER PUBLICATIONS

EPO: Examination Report relating to EP application No. 18305416.2, dated Nov. 18, 2020.
(Continued)

*Primary Examiner* — Allen C Wong
(74) *Attorney, Agent, or Firm* — Rowand LLP

(57) ABSTRACT

Methods and devices for encoding a point cloud. A bit sequence signaling an occupancy pattern for sub-volumes of a volume is coded. Predictive coding is used to find a set of predicted points, from which a corresponding predicted occupancy pattern may be determined. The search for and selection of a coding mode for generating the set of predicted points may include a geometric distortion metric for evaluating how closely the geometry of the predicted set of points aligns with the geometry of the set of points to be coded. The geometric distortion metric may include a sum of absolute value distance between each point and its nearest predicted point. The metric may sum a logarithm of the distances to match more closely with coding rate cost.

20 Claims, 14 Drawing Sheets

(51) Int. Cl.
 *H04N 19/567* (2014.01)
 *H04N 19/517* (2014.01)
 *H04N 19/105* (2014.01)
(58) Field of Classification Search
 USPC .................................................. 375/240.12
 See application file for complete search history.

(56) References Cited

U.S. PATENT DOCUMENTS

2017/0034712 A1  11/2017  Chou et al.
2017/0347122 A1* 11/2017  Chou ................... H04N 19/593

OTHER PUBLICATIONS

Kuhn: "Algorithms, Complexity Analysis and VLSI Architectures for MPEG-4 Motion Estimation", Boston, MA: Kluwer Academic Publ, US Jan. 1, 1999.
International Search Report and Written Opinion, Application No. PCT/CA2019/050400 dated Jun. 18, 2019.
Extended European Search Report, Application No. EP 18305416.2 dated Dec. 4, 2018.
Rufael Mekuria: "Algorithm for inter-predict'ive coding of unorganized Pojnt Cloud Data" Jun. 22, 2015.
Rufael Mekuria et al: "Document describing the quality metric and its usage in the point cloud compression reference software (informative)" Jun. 22, 2015.
Seung-Ryong Han et al: "Approaches to 3D video compression" Jul. 11, 2010.
Rusinkiewicz S et al: Efficient variants of the ICP algorithm. May 28, 2001.
Julius Kammerl et al: "Real-time compression of point cloud streams". May 14, 2012.
Thanou Dorina et al: "Graph-Based Compression of Dynamic 3D Point Cloud Sequences" Apr. 1, 2016.
Robert Cohen et al: "Point-based prediction for point cloud compression". Oct. 19, 2017.
Lasserre S et al: "[PCC] Neighbour-dependent entropy coding of occupancy patterns in TMC3" Jan. 21, 2018.
Madhukar Budagavi: "0ccupancy map coding simplification in PCC TMC2" Jan. 17, 2018.
"PCC Core Experiments for Category 3", 121. MPEG Meeting; Jan. 22, 2018-Jan. 26, 2018; Gwangju Apr. 3, 2018.
"PCC Test Model Category 3 vl", 121. MPEG Meeting;Jan. 22, 2018-Jan. 26, 2018; Gwangju Apr. 16, 2018.
Lasserre S et al: "[PCC] On motion compensation for geometry codjng in TM3" Apr. 11, 2018.
Lasserre S et al: "[PCC] A binary entropy coder for geometry coding in TM3" Apr. 11, 2018.
Lasserre S et al: "[PCC] How to use a predictive set of points for geometry coding in TMC3" Apr. 11, 2018.
WIPO: PCT International Preliminary Report on Patentability relating to PCT application No. PCT/CA2019/050400, dated Oct. 22, 2010.

* cited by examiner $H(b_0, b_1, b_2, ...b_7 | N)$ $H(b_0 | N)\ H(b_1 | N, b_0)\ H(b_2 | N, b_0 b_1)\ ...\ H(b_7 | N, b_0 b_1 b_2 ... b_6)$ split flag = 0 split flag = 1 0000
pop flag = 1000 split flag = 1 1010
pop flag = 01 1001 1000

METHODS AND DEVICES FOR PREDICTIVE CODING OF POINT CLOUDS

FIELD

The present application generally relates to point cloud compression and, in particular to methods and devices for predictive coding of point clouds.

BACKGROUND

Data compression is used in communications and computer networking to store, transmit, and reproduce information efficiently. There is an increasing interest in representations of three-dimensional objects or spaces, which can involve large datasets and for which efficient and effective compression would be highly useful and valued. In some cases, three-dimensional objects or spaces may be represented using a point cloud, which is a set of points each having a three coordinate location (X, Y, Z) and, in some cases, other attributes like colour data (e.g. luminance and chrominance), transparency, reflectance, normal vector, etc. Point clouds can be static (a stationary object or a snapshot of an environment/object at a single point in time) or dynamic (a time-ordered sequence of point clouds).

Example applications for point clouds include topography and mapping applications. Autonomous vehicle and other machine-vision applications may rely on point cloud sensor data in the form of 3D scans of an environment, such as from a LiDAR scanner. Virtual reality simulations may rely on point clouds.

It will be appreciated that point clouds can involve large quantities of data and compressing (encoding and decoding) that data quickly and accurately is of significant interest. Accordingly, it would be advantageous to provide for methods and devices that more efficiently and/or effectively compress data for point clouds.

In some cases of point cloud coding, it may be possible to exploit predictive coding. The prediction may be used to predict point location or attributes, and residual or error data may be encoded.

Nevertheless, a challenge remains in identifying and selecting a suitable geometric prediction. It would be advantageous to provide for methods and devices that code point cloud data using predictions that have been selected with improved accuracy.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
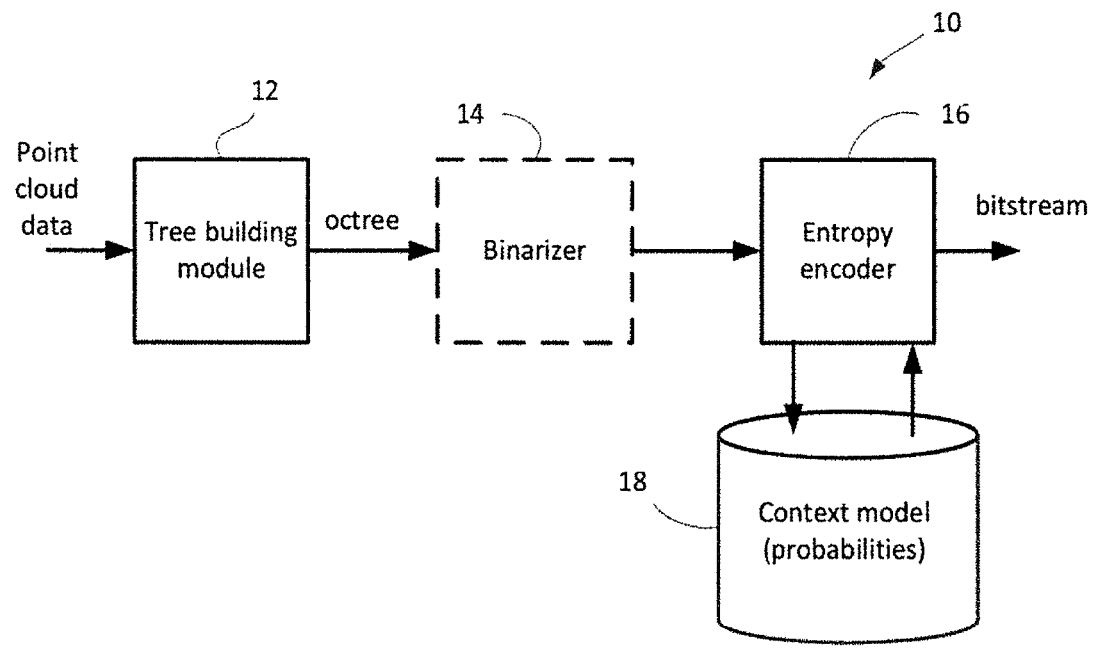
FIG. 1 shows a simplified block diagram of an example point cloud encoder.

The present application describes methods of encoding and decoding point clouds, and encoders and decoders for encoding and decoding point clouds.

In one aspect, the present application describes method of encoding a point cloud to generate a bitstream of compressed point cloud data, the point cloud being located within a volumetric space containing the points of the point cloud, each of the points having a geometric location within the volumetric space, wherein a sub-volume within the volumetric space contains a set of points the locations of which are to-be-coded. The method includes determining a plurality of candidate coding modes, wherein each candidate coding mode transforms a set of previously-coded points into a candidate predicted set of points; selecting a coding mode from among the plurality of candidate coding modes using rate-distortion optimization, where the rate-distortion optimization includes, for one of the candidate coding modes, determining a geometric distortion between the set of points and the candidate predicted set of points produced by said one of the candidate coding modes, and wherein the geometric distortion is determined based on a sum of the absolute distance between each point in the set of points and a respective nearest predicted point in said candidate predicted set of points; and coding the set of points partly based on the predicted set of points determined by the selected coding mode, to generate the bitstream.

In some implementations, the coding mode may include a motion vector defining a translation of the set of previously-coded points to generate the candidate predicted set of points.

In some implementations, the geometric distortion may be determined based on a sum of a non-linear function of the absolute distance between each point and its respective nearest predicted point in said candidate predicted set of points.

In some implementations, the geometric distortion may be determined based on a sum of a logarithm of the absolute distance between each point and its respective nearest predicted point in said candidate predicted set of points. In some such cases, the geometric distortion, D, may be determined in accordance with the expression:

$$D = \sum_{\beta \in B} \log_2\left(1 + \min_{\varphi \in P} \|\beta - \varphi\|_1\right)$$

where B is the set of points in the volume, β is a point in the set of points in the volume, P is the predicted set of points, and φ is the respective nearest predicted point to the point β in the set of points.

In some implementations, the respective nearest predicted point to each point in the set of points is determined by finding, for a particular point in the set of points, a predicted point in the set of predicted points that has an L1 distance from the particular point.

In some implementations, selecting a coding mode may include performing a multi-round iterative search for a locally-best coding mode within a search range, and each successive round of the search may include determining two or more locally-best coding modes and defining successive new search ranges centered around respective points identified by said locally-best coding modes. In some cases, the multi-round search determining two or more locally-best coding modes may include calculating, for each candidate coding mode in a particular round, a rate-distortion expression that includes the geometric distortion attributable to that candidate coding mode, and identifying two or more locally least-cost coding modes for that particular round.

In some implementations, coding the set of points may include context-based entropy coding the set of points using context selection based, at least in part, on the predicted set of points.

In some implementations, the set of previously-coded points are previously-coded points from the point cloud located in a second volume positioned proximate the volume.

In some implementations, the set of previously-coded points are from a second point cloud temporally-related to the point cloud.

In some implementations, wherein the volumetric space is recursively partitioned and one of the partitions is the sub-volume.

In a further aspect, the present application describes encoders and decoders configured to implement such methods of encoding and decoding.

In yet a further aspect, the present application describes non-transitory computer-readable media storing computer-executable program instructions which, when executed, cause one or more processors to perform the described methods of encoding and/or decoding.

In yet another aspect, the present application describes a computer-readable signal containing program instructions which, when executed by a computer, cause the computer to perform the described methods of encoding and/or decoding.

Other aspects and features of the present application will be understood by those of ordinary skill in the art from a review of the following description of examples in conjunction with the accompanying figures.

Any feature described in relation to one aspect or embodiment of the invention may also be used in respect of one or more other aspects/embodiments. These and other aspects of the present invention will be apparent from, and elucidated with reference to, the embodiments described herein.

At times in the description below, the terms "node", "volume" and "sub-volume" may be used interchangeably. It will be appreciated that a node is associated with a volume or sub-volume. The node is a particular point on the tree that may be an internal node or a leaf node. The volume or sub-volume is the bounded physical space that the node represents. The term "volume" may, in some cases, be used to refer to the largest bounded space defined for containing the point cloud. A volume may be recursively divided into sub-volumes for the purpose of building out a tree-structure of interconnected nodes for coding the point cloud data.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as colour, which may also be a three component value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-coloured, highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment. A particular challenge in coding point clouds that does not arise in the case of other data compression, like audio or video, is the coding of the geometry of the point cloud. Point clouds tend to be sparsely populated, which makes efficiently coding the location of the points that much more challenging.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on resolution of the tree and/or whether there are any points contained in the sub-volume. A leaf node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

A commonly-used tree structure is an octree. In this structure, the volumes/sub-volumes are all cubes and each split of a sub-volume results in eight further sub-volumes/sub-cubes. Another commonly-used tree structure is a KD-tree, in which a volume (cube or rectangular cuboid) is recursively divided in two by a plane orthogonal to one of the axes. Octrees are a special case of KD-trees, where the volume is divided by three planes, each being orthogonal to one of the three axes. Both these examples relate to cubes or rectangular cuboids; however, the present application is not restricted to such tree structures and the volumes and sub-volumes may have other shapes in some applications. The partitioning of a volume is not necessarily into two sub-volumes (KD-tree) or eight sub-volumes (octree), but could involve other partitions, including division into non-rectangular shapes or involving non-adjacent sub-volumes.

The present application may refer to octrees for ease of explanation and because they are a popular candidate tree structure for automotive applications, but it will be understood that the methods and devices described herein may be implemented using other tree structures.

Reference is now made to FIG. 1, which shows a simplified block diagram of a point cloud encoder 10 in accordance with aspects of the present application. The point cloud encoder 10 includes a tree building module 12 for receiving point cloud data and producing a tree (in this example, an octree) representing the geometry of the volumetric space containing point cloud and indicating the location or position of points from the point cloud in that geometry.

The basic process for creating an octree to code a point cloud may include:
1. Start with a bounding volume (cube) containing the point cloud in a coordinate system
2. Split the volume into 8 sub-volumes (eight sub-cubes)
3. For each sub-volume, mark the sub-volume with 0 if the sub-volume is empty, or with 1 if there is at least one point in it
4. For all sub-volumes marked with 1, repeat (2) to split those sub-volumes, until a maximum depth of splitting is reached
5. For all leaf sub-volumes (sub-cubes) of maximum depth, mark the leaf cube with 1 if it is non-empty, 0 otherwise The above process might be described as an occupancy-equals-splitting process, where splitting implies occupancy, with the constraint that there is a maximum depth or resolution beyond which no further splitting will occur. In this case, a single flag signals whether a node is split and hence whether it is occupied by at least one point, and vice versa. At the maximum depth, the flag signals occupancy, with no further splitting possible.

In some implementations, splitting and occupancy are independent such that a node may be occupied and may or may not be split. There are two variations of this implementation:
1. Split-then-occupied. A signal flag indicates whether a node is split. If split, then the node must contain a point—that is splitting implies occupancy. Otherwise, if the node is not to be split then a further occupancy flag signals whether the node contains at least one point. Accordingly, when a node is not further split, i.e. it is a leaf node, the leaf node must have an associated occupancy flag to indicate whether it contains any points.
2. Occupied-then-split. A single flag indicates whether the node is occupied. If not occupied, then no splitting occurs. If it is occupied, then a splitting flag is coded to indicate whether the node is further split or not.

Irrespective of which of the above-described processes is used to build the tree, it may be traversed in a pre-defined order (breadth-first or depth-first, and in accordance with a scan pattern/order within each divided sub-volume) to produce a sequence of bits from the flags (occupancy and/or splitting flags). This may be termed the serialization or binarization of the tree. As shown in FIG. 1, in this example, the point cloud encoder 10 includes a binarizer 14 for binarizing the octree to produce a bitstream of binarized data representing the tree.

This sequence of bits may then be encoded using an entropy encoder 16 to produce a compressed bitstream. The entropy encoder 16 may encode the sequence of bits using a context model 18 that specifies probabilities for coding bits based on a context determination by the entropy encoder 16. The context model 18 may be adaptively updated after coding of each bit or defined set of bits. The entropy encoder 16 may, in some cases, be a binary arithmetic encoder. The binary arithmetic encoder may, in some implementations, employ context-adaptive binary arithmetic coding (CABAC). In some implementations, coders other than arithmetic coders may be used.

In some cases, the entropy encoder 16 may not be a binary coder, but instead may operate on non-binary data. The output octree data from the tree building module 12 may not be evaluated in binary form but instead may be encoded as non-binary data. For example, in the case of an octree, the eight flags within a sub-volume (e.g. occupancy flags) in their scan order may be considered a $2^8-1$ bit number (e.g. an integer having a value between 1 and 255 since the value 0 is not possible for a split sub-volume, i.e. it would not have been split if it was entirely unoccupied). This number may be encoded by the entropy encoder using a multi-symbol arithmetic coder in some implementations. Within a sub-volume, e.g. a cube, the sequence of flags that defines this integer may be termed a "pattern".

Like with video or image coding, point cloud coding can include predictive operations in which efforts are made to predict the location of points in a volume. From the predicted locations of points, one can predict the occupancy pattern for a sub-volume. Predictions may be spatial (dependent on previously coded sub-volumes in the same point cloud) or temporal (dependent on previously coded point clouds in a time-ordered sequence of point clouds).

Figure 2:
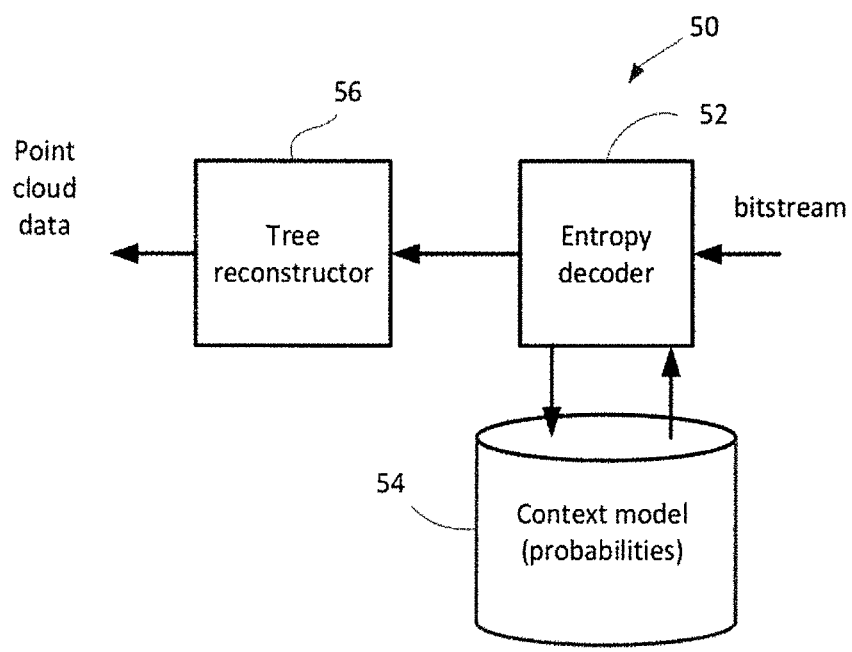
FIG. 2 shows a simplified block diagram of an example point cloud decoder.

A block diagram of an example point cloud decoder 50 that corresponds to the encoder 10 is shown in FIG. 2. The point cloud decoder 50 includes an entropy decoder 52 using the same context model 54 used by the encoder 10. The entropy decoder 52 receives the input bitstream of compressed data and entropy decodes the data to produce an output sequence of decompressed bits. The sequence is then converted into reconstructed point cloud data by a tree reconstructor 56. The tree reconstructor 56 rebuilds the tree structure from the decompressed data and knowledge of the scanning order in which the tree data was binarized. The tree reconstructor 56 is thus able to reconstruct the location of the points from the point cloud (subject to the resolution of the tree coding).

Figure 3:
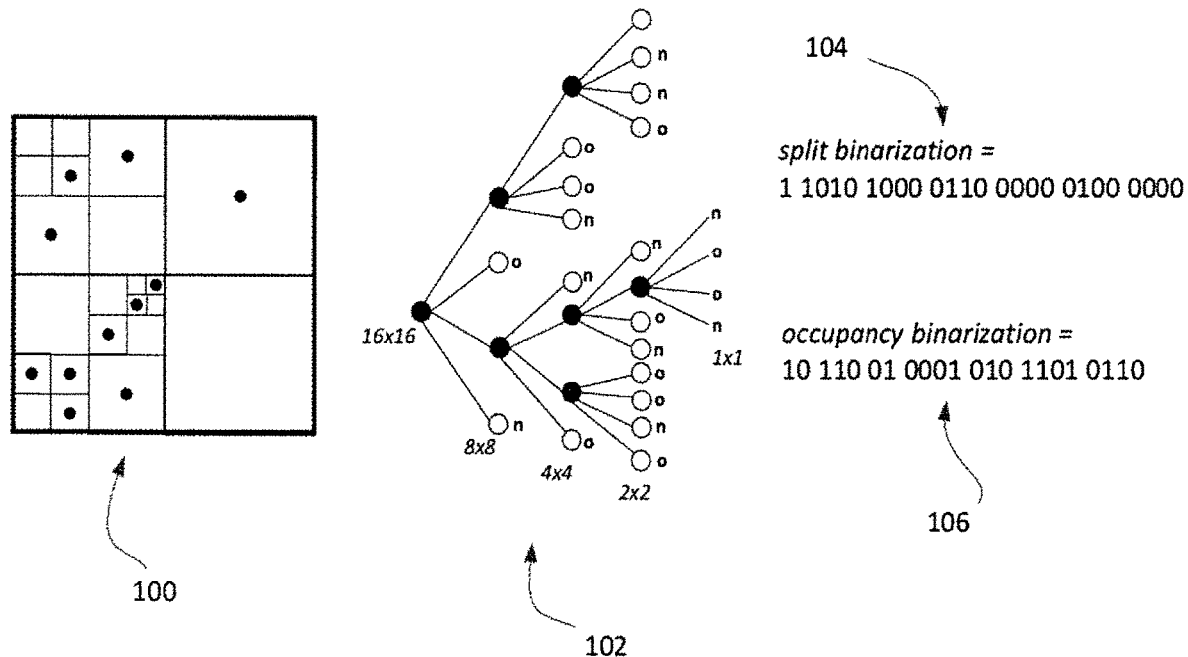
FIG. 3 shows an example partial sub-volume and associated tree structure for coding.

An example partial sub-volume 100 is shown in FIG. 3. In this example, a sub-volume 100 is shown in two-dimensions for ease of illustration, and the size of the sub-volume 100 is 16×16. It will be noted that the sub-volume has been divided into four 8×8 sub-squares, and two of those have been further subdivided into 4×4 sub-squares, three of which are further divided to 2×2 sub-squares, and one of the 2×2 sub-square is then divided into 1×1 squares. The 1×1 squares are the maximum depth of the tree and represent the finest resolution for positional point data. The points from the point cloud are shown as dots in the figure.

The structure of the tree 102 is shown to the right of the sub-volume 100. The sequence of splitting flags 104 and the corresponding sequence of occupancy flags 106, obtained in a pre-defined breadth-first scan order, is shown to the right of the tree 102. It will be observed that in this illustrative example, there is an occupancy flag for each sub-volume (node) that is not split, i.e. that has an associated splitting flag set to zero. These sequences may be entropy encoded.

Figure 4:
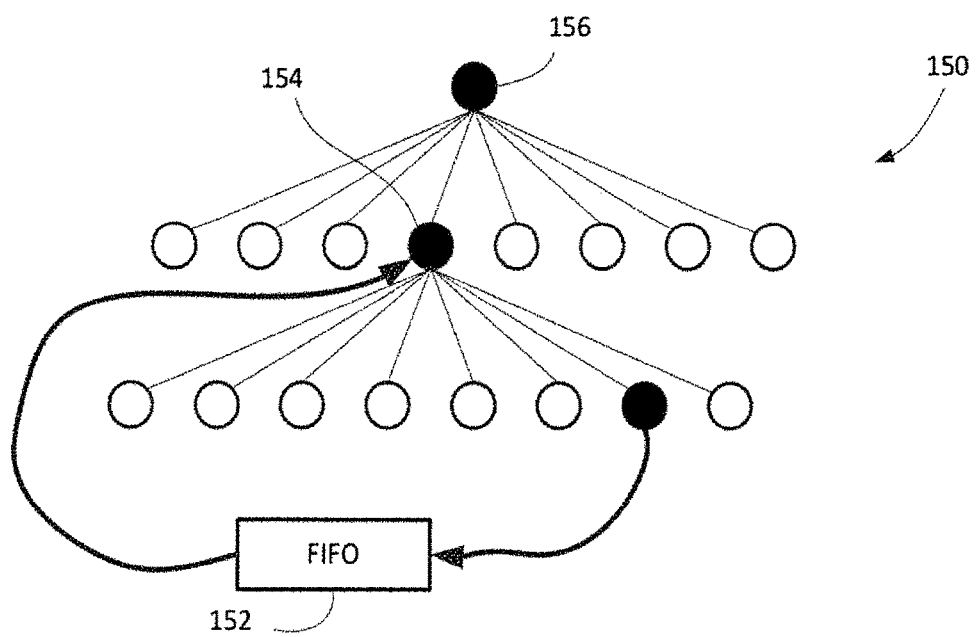
FIG. 4 illustrates the recursive splitting and coding of an octree.

Another example, which employs an occupied ≡ splitting condition, is shown in FIG. 4. FIG. 4 illustrates the recursive splitting and coding of an octree 150. Only a portion of the octree 150 is shown in the figure. A FIFO 152 is shown as processing the nodes for splitting to illustrate the breadth-first nature of the present process. The FIFO 152 outputs an occupied node 154 that was queued in the FIFO 152 for further splitting after processing of its parent node 156. The tree builder splits the sub-volume associated with the occupied node 154 into eight sub-volumes (cubes) and determines their occupancy. The occupancy may be indicated by an occupancy flag for each sub-volume. In a prescribed scan order, the flags may be referred to as the occupancy pattern for the node 154. The pattern may be specified by the integer representing the sequence of occupancy flags associated with the sub-volumes in the pre-defined scan order. In the case of an octree, the pattern is an integer in the range [1, 255].

The entropy encoder then encodes that pattern using a non-binary arithmetic encoder based on probabilities specified by the context model. In this example, the probabilities may be a pattern distribution based on an initial distribution model and adaptively updated. In one implementation, the pattern distribution is effectively a counter of the number of times each pattern (integer from 1 to 255) has been encountered during coding. The pattern distribution may be updated after each sub-volume is coded. The pattern distribution may be normalized, as needed, since the relative frequency of the patterns is germane to the probability assessment and not the absolute count.

Based on the pattern, those child nodes that are occupied (e.g. have a flag=1) are then pushed into the FIFO 152 for further splitting in turn (provided the nodes are not a maximum depth of the tree).

Figure 5:
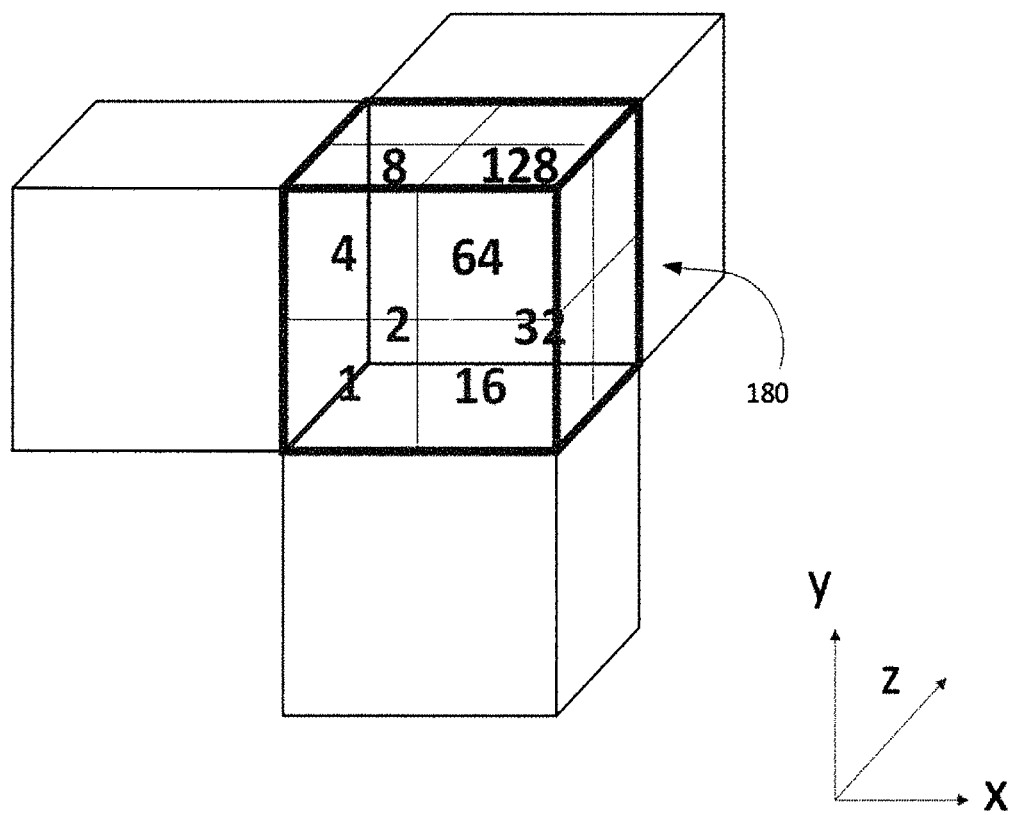
FIG. 5 shows an example scan pattern within an example cube from an octree.

Reference is now made to FIG. 5, which shows an example cube 180 from an octree. The cube 180 is subdivided into eight sub-cubes. The scan order for reading the flags results in an eight bit string, which can be read as an integer [1, 255] in binary. Based on the scan order and the resulting bit position of each sub-cube's flag in the string, the sub-cubes have the values shown in FIG. 5. The scan order may be any sequence of the sub-cubes, provided both the encoder and decoder use the same scan order.

Figure 6:
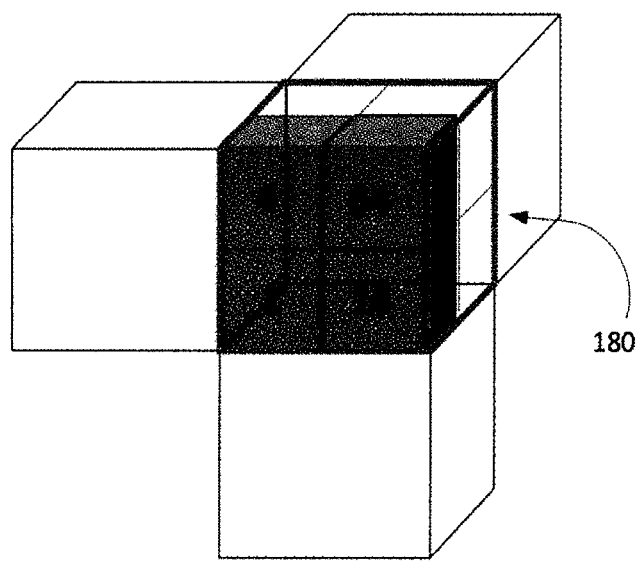
FIG. 6 shows an example occupancy pattern within an example cube.

As an example, FIG. 6 shows the cube 180 the number of probability distributions may equal in which the four "front" sub-cubes are occupied. This would correspond to pattern 85, on the basis that the sub-cubes occupied are cubes 1+4+16+64. The integer pattern number specifies the pattern of occupancy in the sub-cubes.

In European patent application no. 18305037.6, the present applicants described methods and devices for selecting among available pattern distributions to be used in coding a particular node's pattern of occupancy based on some occupancy information from previously-coded nodes near the particular node. In one example implementation, the occupancy information is obtained from the pattern of occupancy of the parent to the particular node. In another example implementation, the occupancy information is obtained from one or more nodes neighbouring the particular node. The contents of European patent application no. 18305037.6 are incorporated herein by reference. This is referred to as determining a "neighbour configuration", and selecting a context (i.e. a pattern distribution) at least partly based on the neighbour configuration.

Figure 7:
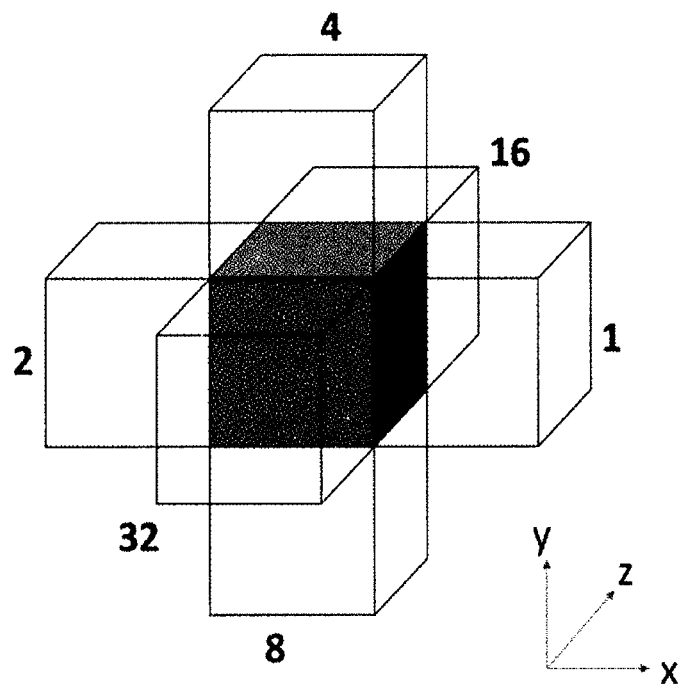
FIG. 7 shows an example of neighbouring sub-volumes.

FIG. 7 illustrates a set of neighbors surrounding a current node, where neighbour is defined as nodes sharing a face. In this example, the nodes/sub-volumes are cubes and the cube at the center of the image has six neighbours, one for each face. In an octree, it will be appreciated that neighbours to the current node will include three sibling nodes. It will also include three nodes that do not have the same parent node. Accordingly, occupancy data for some of the neighboring nodes will be available because they are siblings, but occupancy data for some neighbouring nodes may or may not be available, depending on whether those nodes were previously coded. Special handling may be applied to deal with missing neighbours. In some implementations, the missing neighbour may be presumed to be occupied or may be presumed to be unoccupied. It will be appreciated that the neighbour definition may be broadened to include neighbouring nodes based on a shared edge or based on a shared vertex to include additional adjacent sub-volumes in the assessment.

Figure 8:
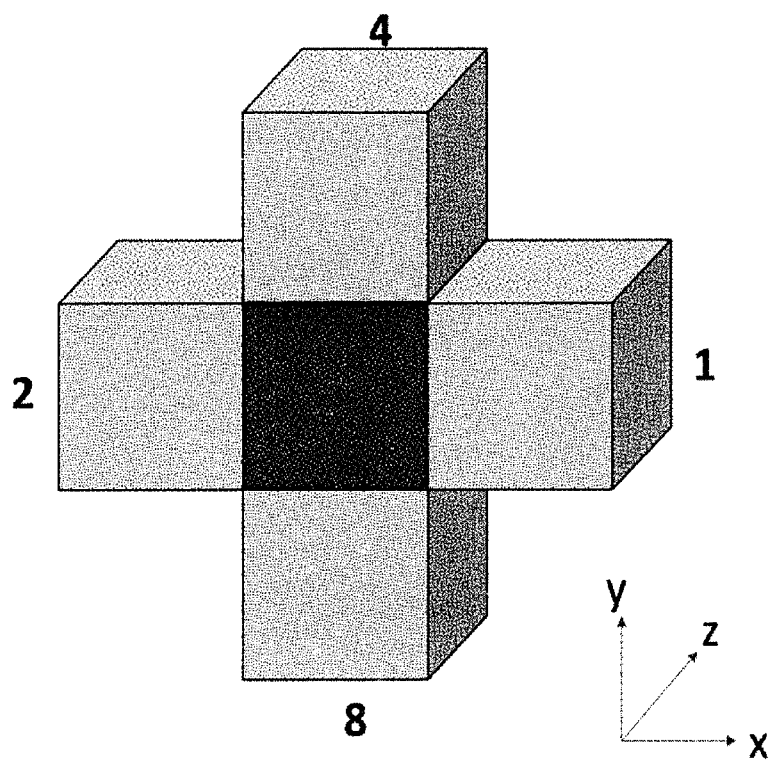
FIG. 8 shows an example neighbour configuration showing occupancy among neighbouring nodes.

The occupancy of the neighbours may be read in a scan order that effectively assigns a value to each neighbour, much like as is described above with respect to occupancy patterns. As illustrated, the neighbouring nodes effectively take values of 1, 2, 4, 8, 16 or 32, and there are therefore 64 (0 to 63) possible neighbour occupancy configurations. This value may be termed the "neighbour configuration" herein. As an example, FIG. 8 illustrates an example of neighbour configuration 15, in which neighbours 1, 2, 4 and 8 are occupied and neighbours 16 and 32 are empty.

In some cases, the number of probability distributions may equal the number of possible occupancy outcomes in the selection criteria. In other words, in the case of a parent pattern for an octree, there would be probability distributions involving 255 probabilities each. In the case of neighbour configuration, if neighbour is defined as sharing a face, there would be 64 probability distributions. However, it will be understood that too many distributions may result in slow adaptation due to scarcity of data, i.e. context dilution. Accordingly, in some embodiments, similar patterns may be grouped so as to use the same probability distribution. For example separate distributions may be used for patterns corresponding to fully occupied, vertically-oriented, horizontally-oriented, mostly empty, and then all other cases.

This could reduce the number of probability distributions to about five. It will be appreciated that different groupings of patterns could be formed to result in a different number of probability distributions.

In one variation to the neighbour-based probability distribution selection, the number of distributions may be reduced by exploiting the symmetry of the neighbourhood. By permuting the neighbour configuration or permuting the pattern distribution, structurally similar configurations having a line of symmetry can re-use the same distribution. As a result, the number of neighbour configurations (and thus distribution patterns), may be reduced. In some cases, the 64 neighbour configurations can be reduced using these techniques to 64, 24, 18 or 10 total neighbour configurations. In other words, neighbour configurations that can use the same pattern distribution may be grouped into a class. A class containing more than one neighbour configuration may be referred to herein as a "neighbour configuration" in that one of the neighbour configurations effectively subsumes other neighbour configurations by way of reflection or permutation of those other configurations.

The above-described techniques of using neighbour occupancy information for coding tree occupancy focus on using non-binary entropy coding of the occupancy pattern, where a pattern distribution is selected based on neighbour occupancy information, i.e. neighbour configuration. However, in some instances, the use of binary coders can be more efficient in terms of hardware implementation. Moreover, on-the-fly updates to many probabilities may require fast-access memory and computation within the heart of the arithmetic coder. Accordingly, it may be advantageous to find methods and devices for entropy encoding the occupancy pattern using binary arithmetic coders. It would be advantageous to use binary coders if it can be done without significantly degrading compression performance and while guarding against having an overwhelming number of contexts to track.

The use of binary coders in place of a non-binary coder is reflected in the entropy formula:

$$H(X_1, X_2 | Y) = H(X_1 | Y) H(X_2 | Y, X_1)$$

where $X = (X_1, X_2)$ is the non-binary information to be coded, and Y is the context for coding, i.e. the neighbour configuration or selected pattern distribution. To convert non-binary coding of X into binary coding, the information $(X_1, X_2)$ is split into information $X_1$ and $X_2$ that can be coded separately without increasing the entropy. To do so, one must code one of the two depending on the other, here $X_2$ depending on $X_1$. This can be extended to n bits of information in X. For example, for n=3:

$$H(X_1, X_2, X_3 | Y) = H(X_1 | Y) H(X_2 | Y, X_1) H(X_3 | Y, X_1, X_2)$$

It will be understood that as the occupancy pattern, i.e. bit sequence X, gets longer there are more conditions for coding later bits in the sequence. For a binary coder (e.g. CABAC) this means a large increase in the number of contexts to track and manage. Using an octree as an example, where the occupancy pattern is an eight-bit sequence $b = b_0 \ldots b_7$, the bit sequence may be split into the eight binary information bits $b_0 \ldots b_7$. The coding may use the neighbour configuration N (or NC) for determining context. Assuming that we can reduce the neighbour configurations to 10 effective neighbour configurations through grouping of neighbour configurations into classes of invariance, as described above, then N is an integer belonging to $\{0, 1, 2, \ldots, 9\}$. For shorthand, the "classes of invariant neighbour configurations" may be referred to herein, at times, simply as the "neighbour configurations", although it will be appreciated that this reduced number of neighbour configurations may be realized based on the class-based grouping of neighbour configurations based on invariance.

Figure 9:
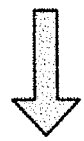
FIG. 9 illustrates the equivalence between non-binary coding and cascaded binary coding for an occupancy pattern.

FIG. 9 illustrates the splitting of an eight-bit pattern or sequence into eight individual bits for binary entropy coding. It will be noted that the first bit of the sequence is encoded based on the neighbour configuration, so there are ten total contexts available. The next bit of the sequence is encoded based on the neighbour configuration and any previously-encoded bits, i.e. bit $b_0$. This involves 20 total available contexts: obtained as the product of 10 from N and 2 from $b_0$. The final bit, $b_7$, is entropy encoded using a context selected from 1280 available contexts: obtained as the product of 10 from N and 128 from the partial pattern given by the previously-encoded bits $b_0, \ldots, b_6$. That is, for each bit the number of contexts (i.e. possible combinations of conditions/dependencies) is the product of the number of neighbour configurations defined (10, in this example, based on grouping of the 64 neighbour configurations into classes), and the number of partial patterns possible from the ordered sequence of n-1 previously-encoded bits (given by $2^{n-1}$).

As a result, there are a total of 2550 contexts to maintain in connection with binary coding of the occupancy pattern. This is an excessively large number of contexts to track, and the relative scarcity may cause poor performance because of context dilution, particularly for later bits in the sequence.

Accordingly, in some cases the encoders and decoders that determine whether the set of contexts can be reduced and, if so, apply a context reduction operation to realize a smaller set of available contexts for entropy coding at least part of an occupancy pattern using a binary coder. In at least some implementations, the context reduction is applied a priori to realize a reduced or smaller set of contexts that are then used by the encoder and decoder based on determining that the context reduction conditions are met. Those conditions may include determining that a neighbour configuration is empty or full, or that the bit being coded is at or above a particular position in the bit sequence, for example.

The context reduction operation reduces the number of available contexts in a set of available contexts to a smaller set containing fewer total contexts. It will be recalled, that the number of available contexts may depend, in part, on the bit position in the sequence, i.e. the index, since the context may depend on a partial pattern of previously-coded bits from the bits sequence. In some implementations, the number of contexts available in the set, before reduction, may be based on the number of neighbour configurations multiplied by the number of partial patterns possible with the previously-coded bits. For a bit at index i, where i ranges from 0 to n, the number of partial patterns may be given by $2^i$.

Example context reduction operations include reducing neighbour configurations for later bits in the bit sequence on the basis that previously-coded bits are associated with sub-volumes that screen or shield one of the neighbouring volumes, meaning the occupancy data provided by the previously-coded bits is more significant and relevant than the occupancy data associated with the shielded volume. Another example context reduction involves special handling of cases such as empty neighbour configurations or completely full neighbour configurations. Such situations may indicate a lack of directionality and, thus, less need to take into account the order of previously-coded bits associated with the sub-volumes. Finally, an example context reduction operation is applying a mapping of a set of contexts to a smaller set of contexts based on determining statistical similarities between pairs of contexts. The statistical similarities may be based on a distance metric between the pairs of contexts. Any such context reduction operations may be used individually or together in combination or sub-combination in some cases to reduce then number of contexts available for binary entropy coding at least some of the bits of an occupancy pattern.

Prediction in Occupancy Coding

As noted earlier, point cloud coding may involve the use of predictive coding. As will be familiar from video coding, predictive coding may include inter-prediction, where points for a sub-volume in the point cloud are predicted from the points of a previously-coded point cloud with high temporal correlation, or intra-prediction, where points for the sub-volume are predicted from previously-coded nearby points in the same point cloud. In either case, the previously-coded points are used to build a set of predicted points within the same geometric space as the sub-volume. With intra-prediction, a local plane estimation may be used to obtain a predicted set of points.

In video, prediction is understood as building a block of predicted pixels located in exactly the same spot as the block of pixels being coded. That is there is a one-to-one pixel-to-predicted-pixel correspondence, and the prediction attempts to predict the colour (e.g. Y, Cr, Cb). Intra-coding builds a predicted block of predicted pixels based on the colour values of nearby previously-coded pixels and an intra-coding direction. Inter-coding builds a predicted block by finding a block in a temporally related frame and translating it to the location of the current block based on a motion vector. Effectively, the motion vector identifies where to find the block in the related frame that will be used as a predicted block. The colour values of the pixels in the block in the related frame serve as the predicted colour values.

In the case of point cloud data, the prediction may be more complex. The data to be coded includes geometric location of points within a volume (and possibly other attributes, like colour). An inter-coding prediction built from a temporally-related point cloud may be based on selecting a volume and translating and/or transforming that volume such that it is positioned so as to subsume (i.e. contain) the space occupied by the volume to-be-coded. Note that this does not necessarily result in a one-to-one point-to-predicted-point correspondence. Moreover, the movement of the volume of points may include both simple translation by 3D motion vector and transformation(s). The transformations may include solid transformations such as rotations, but could include non-solid transformations/deformations. A general matrix formulation for generating a 3D prediction is given by:

$$\begin{bmatrix} X' \\ Y' \\ Z' \end{bmatrix} = \begin{bmatrix} * & * & * \\ * & * & * \\ * & * & * \end{bmatrix} \begin{bmatrix} X \\ Y \\ Z \end{bmatrix} + \begin{bmatrix} V_x \\ V_y \\ V_z \end{bmatrix}$$

The motion vector V ($V_x$, $V_y$, $V_z$) gives a 3D translation, whereas the 3×3 matrix provides for possible transformation. If the 3×3 matrix is zero, one has only 3D translation along the vector V. In the case where the matrix is orthonormal, one obtains a solid transformation without local deformation of the set of points. A more general matrix allows for non-solid deformations.

Selecting a Coding Mode for Prediction

The more complex structure of point clouds, and the fact that a prediction may not have a one-to-one correspondence with the points within the volume to-be-coded make selection of a suitable prediction more difficult. To select a suitable prediction, the present application provides, in one aspect, that a set of candidate coding modes are to be evaluated within a search range. Each candidate coding mode produces a candidate predicted set of points from a set of previously-coded points, where the candidate predicted set of points occupy a prediction volume within the 3D coordinate system. The coordinates of prediction volume include the coordinates of the volume to-be-coded (in a simple case, the prediction volume matches the volume to-be-coded in size).

Selection of a candidate coding mode may rely on rate-distortion evaluation. The determination of rate cost may be relatively straightforward, but the determination of distortion cannot be easily determined. Because a point-to-be-coded does not necessarily have a corresponding predicted point at the same location, colour distortion is difficult to quantify. Moreover, it is not clear how to quantify distortion in geometry.

In accordance, with one aspect of the present application, the measurement of distortion between the set of predicted points within the prediction volume and the set of points to-be-coded in the current volume is based on a sum of absolute differences between each point of the set of points to-be-coded and its nearest predicted point. This metric may be suitable, based in part on how the prediction is to be used in coding, which is discussed further below.

Figure 10:
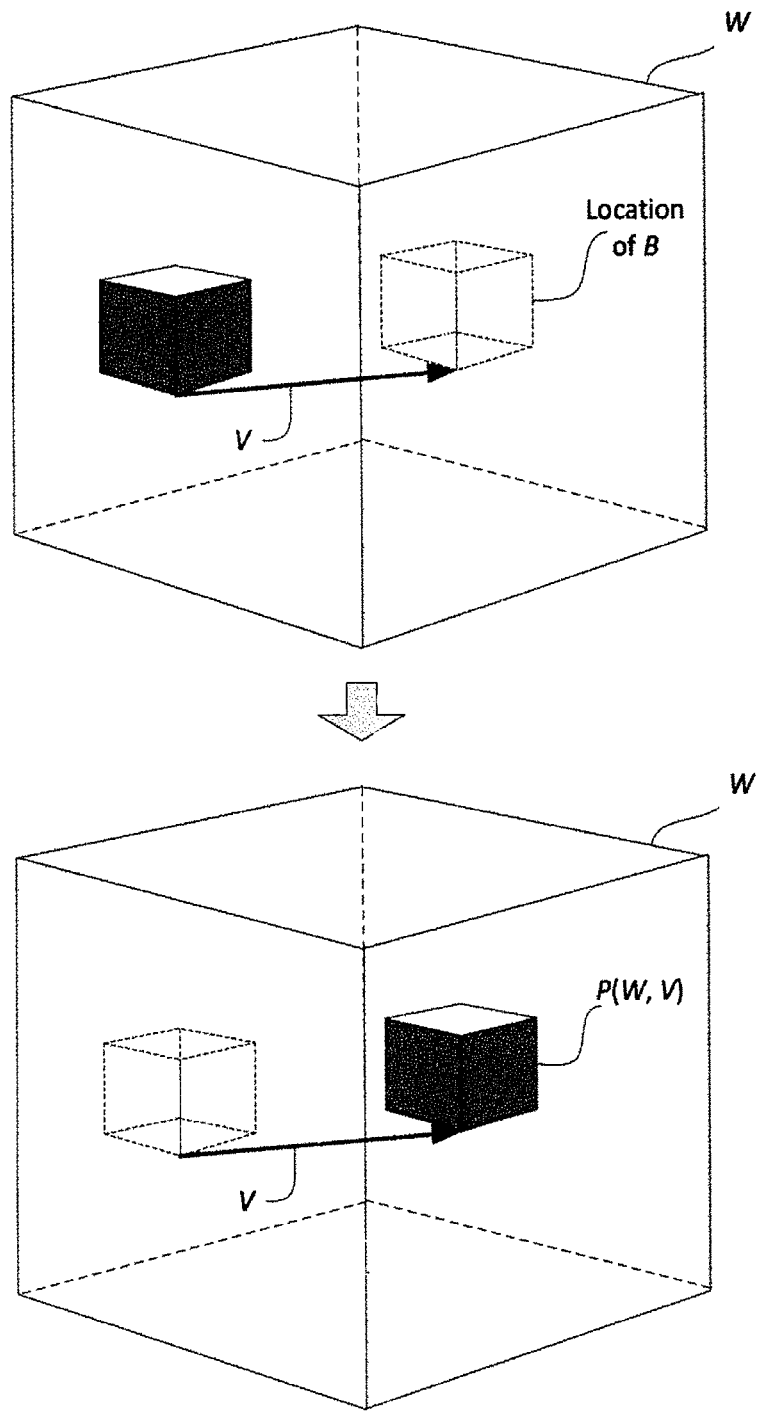
FIG. 10 illustrates the generation of a predicted set of points based on a motion vector.

Reference is now made to FIG. 10, which shows a search volume W of previously-coded points of a point cloud. For the purposes of the present illustration, inter-coding may be presumed, such that the search volume W is with respect to the points in a point cloud at time T1. The points to be coded, B, are from a point cloud at time T2 and are located in a volume positioned at a particular set of coordinates that fall within the coordinates of the search volume W (which may be centered around the location of the volume containing B in some implementations). The intersection of the volume and the point cloud defines the set of points B. The volume may be referred to as a prediction unit in some instances. Prediction units will be discussed further below.

A candidate coding mode M specifies a translation (and/or transformation) that, when applied to the points in W results in a repositioning of the previously-coded points in accordance with the coding mode. In this example, the coding mode M specifies a translation by three-dimensional vector V. The repositioned points are a candidate set of predicted points P. The candidate set of predicted points P is a function of W and the candidate coding mode M: P(W,M). In this case, the coding mode M is the vector V, so P(W,M)=P(W, V).

The distortion D(M)=D(B, P(W,M)) may be determined to assess how well the set of predicted points P(W, M) match up to the set of points B within the volume. That distortion may be measured as:

$$D(B, P) = \sum_{\beta \in B} \log_2\left(1 + \min_{\varphi \in P} \|\beta - \varphi\|_1\right)$$

where B is the set of points to be coded in the volume, $\beta$ is a point in the set of points B, and the notation $\beta \in B$ indicates that the summation occurs over all of the points to be coded in the volume. The notation co refers to a point in the candidate set of prediction points P. The distance to a nearest prediction point taken from the candidate set of predicted points P is calculated as:

$$\min_{\varphi \in P} \|\beta - \varphi\|_1$$

where $\|\cdot\|_1$ stands for the L1 norm. In 3D coordinates (X, Y, Z), the distance $\|\beta-\varphi\|_1$ may be determined from the sum of absolute coordinate differences given by $|\beta_X-\varphi_X|+|\beta_Y-\varphi_Y|+|\beta_Z-\varphi_Z|$. Another norm like the L2 norm may be used instead of the L1 norm, such as:

$$\|\beta-\varphi\|_2^2 = |\beta_X-\varphi_X|^2+|\beta_Y-\varphi_Y|^2+|B_Z-\varphi_Z|^2$$

The present application is not limited to a specific norm to compute the distance between points β and φ, however it will be appreciated that the L1 norm may be computationally simpler to obtain than the L2 norm.

A base-2 logarithm assists in converting the error values to a value closer to the bitrate required to code the error, thus making the distortion more compatible with the rate within the Lagrange cost expression of a rate-distortion optimization (RDO) process. In approximate terms, an error of 1 will require one bit for correction, whereas an error of $2^N-1$ will require N bits for correction. Accordingly, the $\log_2$ factor assists in improving the RDO process, particularly in the case of coding geometric data for an octree.

This distortion is a one-way distance of B relatively to P that values zero if and only if B is included in P. Practically, distortion expressed the other way, i.e. D(P,B), is not needed because it is likely that the density of points of B is similar to the density of points of P. Moreover, one-way distortion is much simpler and faster to calculate that two-way distortion. In case B and P have the same number of points, and if the distortion D(B,P) is zero, then one has the equality B=P, and the value D(P,B) is not needed to decide the equality.

In some other implementation, the distortion includes a sum of non-linear functions other than of the form $\log_2(1+x)$, where x is the magnitude of the geometric mismatch. For example, a logarithm other than a base-2 logarithm may be used in some cases. Instead of a logarithm, a power function may be used, such as $x^p$, where p is less than 1, such as a square root. Any selected non-linear function should evaluate to zero when the geometric mismatch is zero, since a perfect match implies zero distortion. In some cases, the non-linear function may be capped at a maximum value (a saturation limit) so that one very poorly predicted point does not overwhelm the distortion measurement. For example, the expression may be g(x)=min (f(x), s), where s is the maximum.

As mentioned above, the identification of a "best" coding mode may be based on a search and evaluation of candidate coding modes within a search range. The search may, in some cases, be iterative. Although this may result in selection of a local minimum rather than a globally optimized minimum, it may reduce the computational burden on the encoder. In such embodiments, the coding mode search is an iterative process that converges to a local minimum, i.e. a "best" coding mode, that minimizes the RDO function locally.

As noted above, the coding mode in 3D point cloud prediction may include translation and transformation. For the purposes of the present illustration and explanation, the coding mode will be presumed to involve translation without transformation. That is, the coding mode specifies a motion vector that indicates the location of a 3D volume within the search range W in the previously-coded portion of the point cloud (or a temporally-related previously-coded point cloud). For the example illustrated below, the search is presumed to be within a temporally related point-cloud.

The RDO function for finding the locally-optimal motion vector V in this illustrative example may be expressed as:

$$C(V)=D(B,P(W,V))+\lambda R(V)$$

where C(V) is the RDO cost associated with vector V, which specifies predicted set of points P(W, V) given search range W within the previously-coded points, and λ is the Lagrange parameter.

Accordingly, the vector $V_{best}$ that minimizes the cost is obtained by:

$$V_{best}(B) = \underset{V}{\mathrm{argmin}} C(V) = \underset{V}{\mathrm{argmin}} D(B, P(W, V) + \lambda R(V))$$

Figure 11:
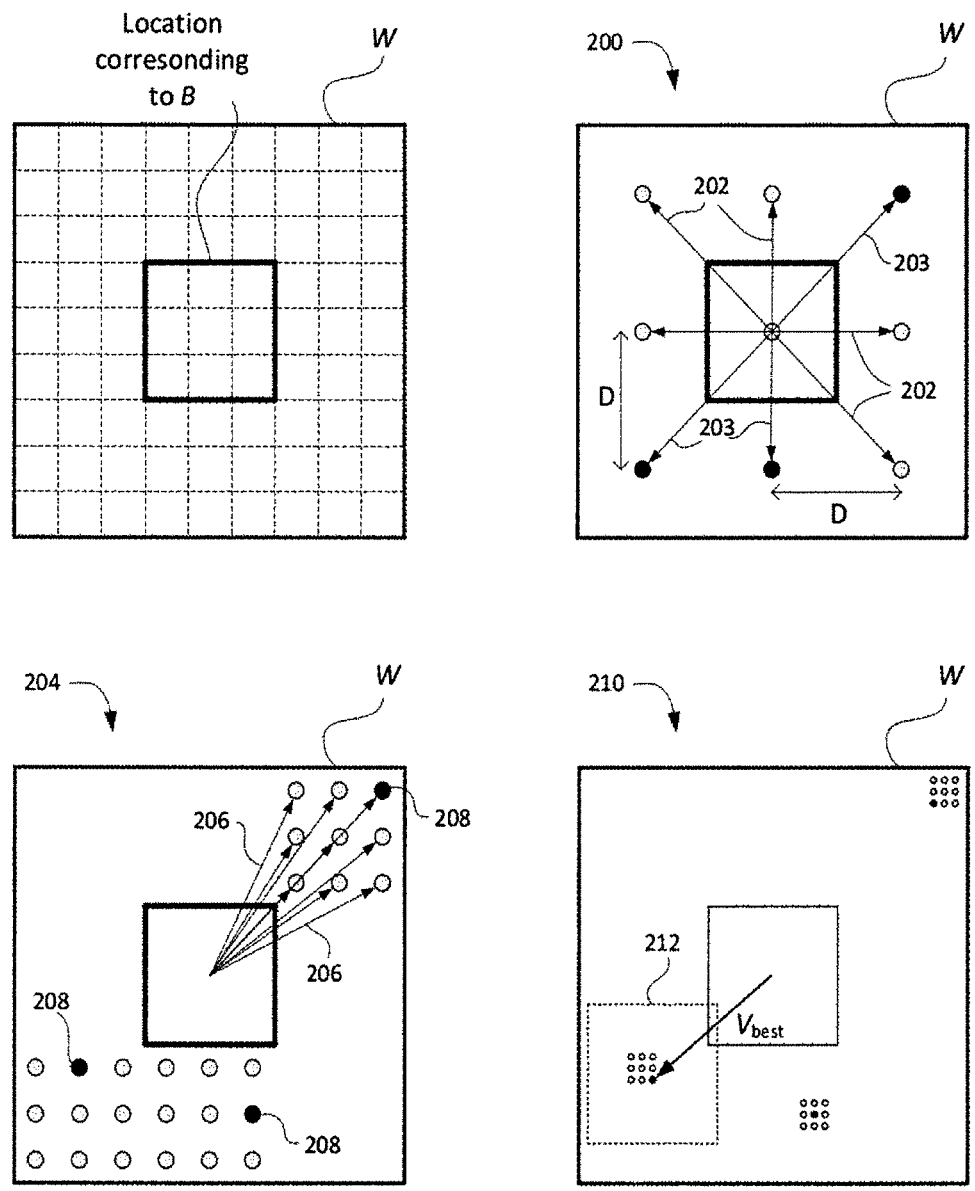
FIG. 11 diagrammatically shows an illustrative example of an iterative motion vector search in two-dimensions.

Reference is now made to FIG. 11, which diagrammatically illustrates one example of an iterative search algorithm. For ease of explanation and illustration, the example is shown in 2-dimensions, but it will be appreciated that the operations and principles are easily extended to 3-dimensions, or N-dimensions, in light of the description herein, where N-dimensions may account for additional parameters.

In this example, the block containing the set of points B is presumed to be a 3×3 block (or 3×3×3 in a 3D example, or $3^N$ in an N-dimensional example), and the iterative search centers around the geometric location of the block (here labelled "B") within a search space or range W. A first round 200 of the iterative search may begin with a set of coarse candidate vectors 202 within the search space W. In this example, The search includes the zero vector (V=0) and vectors pointing to 3×3 blocks surrounding the block containing B. Obviously other patterns may be used in other embodiments and there may be fewer or more coarse candidate vectors 203. The first round 200 search patterns is a grid of points based on a displacement D.

For each of the candidate vectors 202, the cost is determined in accordance with an RDO expression, such as those shown above, and the $N_{best}$ candidate vectors 202 are identified. In this example, $N_{best}$ is set to three, such that in the first round 200, the three best (least cost) candidate vectors 202 are identified, as indicated by the dark circles on FIG. 11.

In the second round 204, the search is again conducted, but this time there are three search ranges, each centered around the respective points identified by the $N_{best}$ candidate vectors from the first round 200. The second round candidate vectors 206 include each of the $N_{best}$ candidate vectors and vectors that point to a sub-grid centered at the point indicated by each $N_{best}$ candidate vector. The sub-grid is based on a displacement of D/2. The cost of each second round candidate vector 206 is then determined and the $N_{best}$ second round candidate vectors 208 are kept.

This same process is repeated in a third round 210 in this example. A stopping condition, such as $D=D_{min}$, results in a final set of candidate vectors from which the local best (least cost) candidate vector, $V_{best}$, is selected. The number of iterations and the stopping conditions may be modified to suit particular implementations. The vector $V_{best}$ identifies a block 212 (cuboid in 3D) of previously-coded point data to be translated by $-V_{best}$ to serve as the set of predicted points P.

It will be appreciated that the selection process may be further improved through including colour distortion as part of the cost function, if colour is an attribute for the particular point cloud being coded. It will be appreciated that not all point clouds have colour attributes, and some have other attributes that may be incorporated in the cost function in a manner similar to colour. To incorporate the cost of colour distortion, a term E may be added to the RDO cost expression:

$$C(V) = D(B, P(W, V)) + \mu E(B, P(W, V)) + \lambda R(V)$$

The distortion E may be computed in the YCbCr colour space using the formula:

$$E(B, P) = \sum_{\beta \in B} \|YCbCr(\beta) - YCbCr(\varphi_{nearest}(\beta))\|_1$$

The nearest predicted point co in P to a point β in B may be defined as:

$$\varphi_{nearest}(\beta) = \underset{\varphi \in P}{\mathrm{argmin}} \|\beta - \varphi\|_1$$

The predicted colour error of a point β is defined as the colour difference with the closest predicted point $\varphi_{nearest}(\beta)$, and the distortion is obtained by the sum over all points β of B. The colour difference is preferably performed in the YCbCr space but may performed in other spaces like RGB, or on Y only. In another embodiment, the difference may be weighted with a higher weight on the luma component Y relatively to the two other components Cb and Cr.

A balancing parameter μ between geometry and colour distortions is introduced to weight the distortion E. If μ=0, then there is no colour distortion in the cost and the mode selection process targets optimal geometry prediction without trying to optimize the colour prediction. On the other hand, if μ=∞ optimal colour prediction is targeted independently on the geometric quality D and the bitrate.

A residual colour res(β) may be obtained by:

$$res(\beta) = YCbCr(\beta) - YCbCr(\varphi_{nearest}(\beta))$$

In the above examples, it was presumed that the volume that contains the set of points B was known. Selecting a suitable volume for selecting the set of points B for which a prediction is to be generated is a further challenge in predictive coding of point clouds.

Point clouds have a fundamental difference relatively to video where all pixels are occupied: points of a point cloud do not occupy the whole 3D space. On the contrary, the space is generally very sparsely occupied by the points of the point cloud. Consequently, only parts of the space that are occupied by the current point clouds should be eligible to undergo a prediction. A global structure may be useful to signal these eligible parts. In this regard, the concept of a 3D Largest Prediction Unit (LPU) may be introduced.

In general, a 3D space may be partitioned into LPUs, inside of which local prediction modes (coding modes) may be selected. For simplicity, LPUs in this example may be 3D cuboids obtained from a regular grid partitioning of the 3D space. An LPU that contains at least one point of the point cloud is a populated LPU and an LPU that contains no points of the point cloud is a non-populated LPU.

A flag may be used to signal whether or not each LPU is populated. However, this may lead to many flags to encode and, in order to improve compression, these flags may be inferred by the collocated LPU of a reference frame and/or neighbouring LPUs of the current frame, in some embodiments.

Depending on the local topology, a LPU may be too big to adequately obtain a prediction of the points belonging to it. Thus, it may be advantageous to split a LPU into smaller Prediction Units (PUs). The determination of whether to split an LPU into smaller PUs may be built into the RDO-based coding mode selection process. A flag may indicate whether a PU is further split for any PU that is populated, unless it may be inferred to be split/not-split based on side information. For example, maximum split depth may imply "not split".

Figure 12:
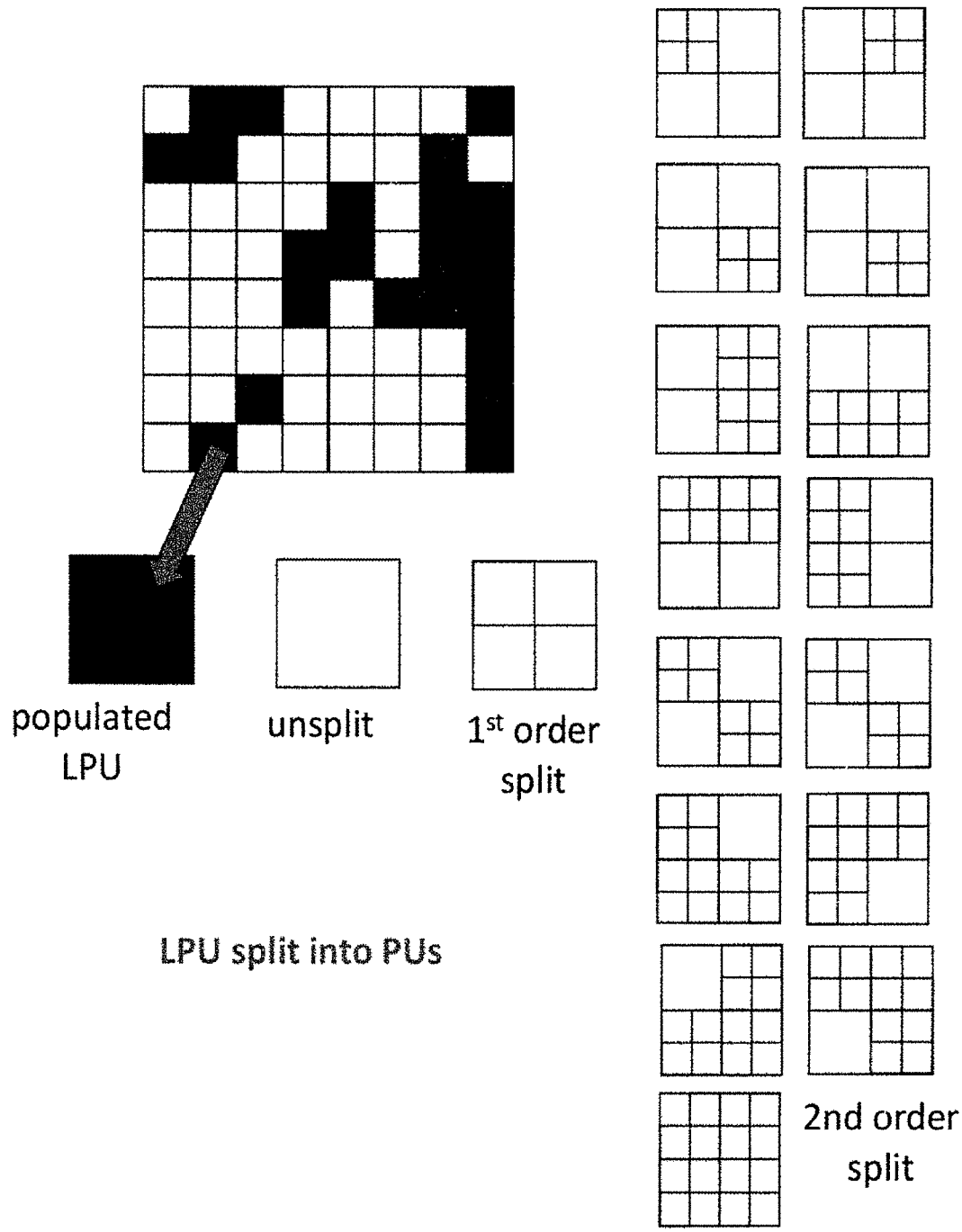
FIG. 12 shows an example of largest prediction unit partitioning.
Figure 13:
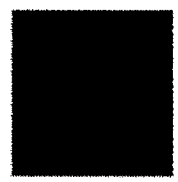
FIG. 13 shows an example of prediction unit split and occupancy signaling.
Figure 13:
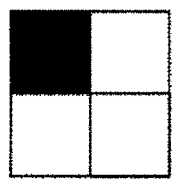
Figure 13:
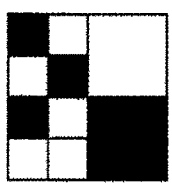

FIG. 12 shows, in 2D form for simplicity, the various $1^{st}$ and $2^{nd}$ order splitting of an LPU into PUs. An example of splitting/occupancy flags for an illustrative 2-D embodiment is shown in FIG. 13.

The cost of coding the PU tree may further be incorporated into the cost function for the RDO-based search process. To select the best PU structure during the competitive process, the encoder may use the additive property of the costs. Individual PU costs are summed together with the PU tree associated rate to obtain the total cost of a LPU. The LPU structure, together with its associated modes, having the least cost may be selected as the best structure.

Many of the above examples involve tree-based coding of the point cloud geometry. It will understood that the above-described processes for selecting a suitable prediction may be applied in the case of other point cloud geometry coding techniques. For example, image based methods code the geometry in depth maps. Predictive coding may be used by generating a prediction between 2D blocks of depth maps (e.g. a current depth map to be coded and a reference depth map). The metric for determining distortion in calculating the RDO cost may be computed in 3D after de-projection of the two 2D blocks to obtain two 3D sets (B and P) of points. This permits the use of the above-described 3D geometric distortion metric in determining or selecting a coding mode for generating a predicted depth map.

Using a Prediction to Improve Compression of Point Cloud Data

In some implementations, a prediction may be used to generate a predicted occupancy of a node of an octree. The residual between the predicted occupancy pattern and the actual occupancy pattern may then be encoded; however, this technique does not mesh well with the improvements to context selection based on neighbouring volumes (neighbour configuration) and/or previously-encoded bits of the bits sequence, both of which are based on exploiting non-random directionality in the occupancy pattern.

Accordingly, in another aspect, the present application proposes methods and device for using point cloud predictions to improve the context-based coding process through improved context selection for coding the actual occupancy patterns. In some embodiments, the coding is binary entropy coding.

The contexts for coding the occupancy pattern may be subdivided into two or more subsets of contexts. In one example implementation, when coding an occupancy pattern for a sub-volume and selecting a context for coding, the context selection uses a first subset if the prediction indicates that the sub-volume contains no predicted points and uses a second subset if the prediction indicates that the sub-volume contains at least one predicted point. The coding may include coding a bit of an occupancy pattern in a binary entropy coder, in some examples.

Figure 14:
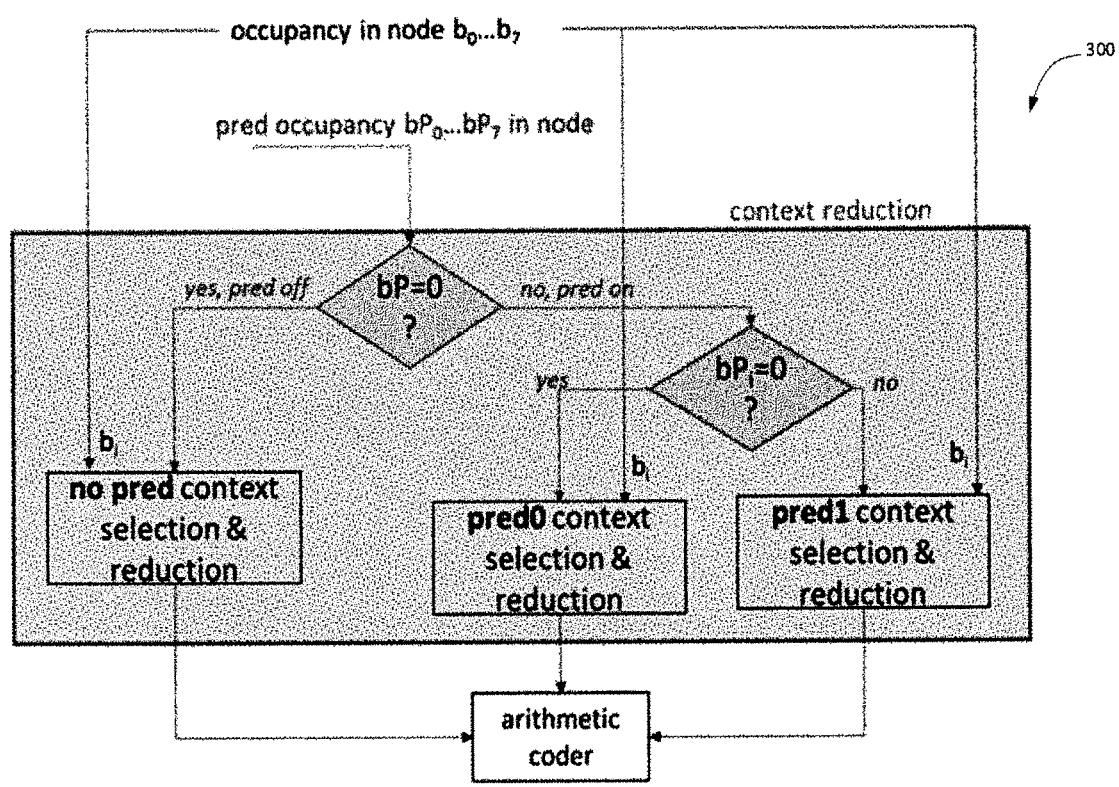
FIG. 14 shows a first example of part of a context-based entropy coder.

Reference is now made to FIG. 14, which shows, in block diagram form, part of a first example of a context-based entropy coder 300 for use in encoding or decoding point cloud data. The context-based entropy coder 300 generates a predicted set of points in accordance with a coding mode. The context-based entropy coder 300 may be used to code an occupancy pattern, e.g. $b_0 \ldots b_7$, associated with a volume that has been subdivided into sub-volumes, where the occupancy pattern is a bit sequence where each bit $b_i$ indicates the occupancy status of a respective one of the sub-volumes in a prescribed order within the volume. The context-based entropy coder 300 may determine a predicted occupancy pattern, e.g. $bP_0 \ldots bP_7$, using the same volume/sub-volume partitioning of the space, where the predicted occupancy pattern is a bit sequence in which each bit $bP_i$ indicates whether there is at least one predicted point in a respective one of the sub-volumes in the prescribed order.

Rather than creating a residual by comparing the occupancy pattern to the predicted occupancy pattern, e.g. using XOR, the context-based entropy coder 300 uses the predicted occupancy pattern as the basis, at least in part, for selecting a context for coding the occupancy pattern. In some cases, the predicted occupancy pattern is the basis for selecting between two or more context sets, and further information, such as neighbour configuration and/or previously-coded bits of the occupancy pattern, serve as the basis for selecting a context from within the selected context set.

In this example, the context-based entropy coder 300 first determines whether the predicted occupancy pattern is empty. That is, whether $bP_i=0$ for all $i=0, \ldots, 7$. In such a case, there is effectively no prediction available with respect to the volume being coded, and prediction-based selection of contexts may be disabled for the coding of the occupancy pattern. As a result, in this case, the context-based entropy coder may select contexts for coding the occupancy pattern using whatever non-predictive context-based selection process is implemented. This may include reference to neighbour configuration, previously-coded bits of the bit sequence, etc.

If the predicted occupancy pattern is not empty, then on a bit-by-bit basis the context-based entropy coder 300 selects a context and codes the occupancy pattern bits. In this regard, it may, for each bit determine whether the corresponding sub-volume contains at least one predicted point, i.e. whether $bP_i$ is non-zero. If $bP_i$ is zero, it indicates that the corresponding sub-volume is predicted to be empty. On that basis the context-based entropy coder may select a first set of contexts, whereas if the prediction indicates that the sub-volume is predicted to contain at least one predicted point, then the context-based entropy coder may select a second set of contexts. Context selection within those respective sets may then occur for the bit $b_i$ based on context selection criteria or conditions, such as neighbour configuration, previously-coded bits of the sequence, etc. In some cases, the context selection for a bit $b_i$ from a set of available contexts is based on a combination of neighbour configuration, previously-coded bits of the occupancy pattern, and the predicted occupancy pattern bit $bP_i$, all of which are used to determine the index to a set of contexts that selects the context for use in coding the bit $b_i$. Once the context for coding $b_i$ has been determined, the bit bi is coded using an arithmetic coder.

Figure 15:
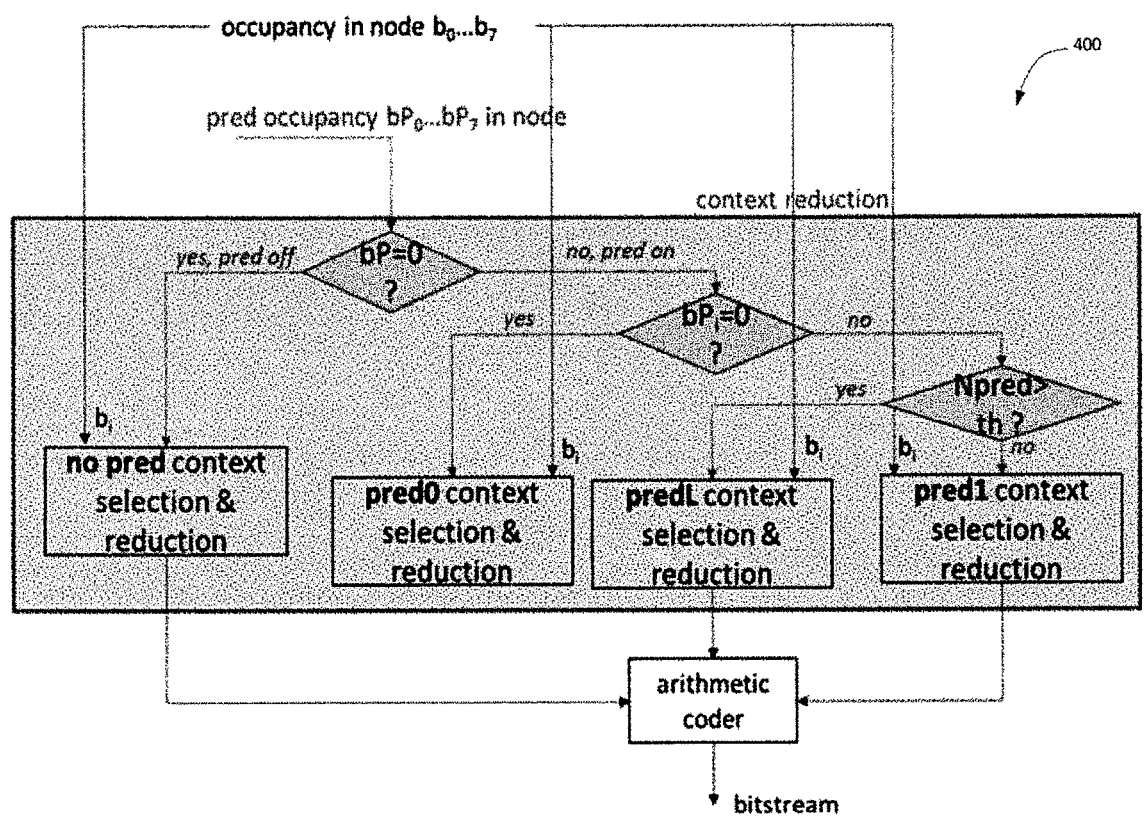
FIG. 15 shows a second example of part of a context-based entropy coder.

Referring now to FIG. 15, another example of a context-based entropy coder 400 is shown. In this example, the entropy coder 400 uses the predicted occupancy pattern bP to select between subsets of contexts. If the predicted occupancy pattern is empty, the predictive context selection feature is disabled for coding the occupancy pattern and the coder 400 selects contexts using other criteria. The contexts may, in some embodiments, be selected from a first subset of contexts. If the predicted occupancy pattern is not empty, then the entropy coder 400 determines whether, for each bit $b_i$ to be coded, the corresponding predicted occupancy pattern bit $bP_i$ is non-zero. If it is zero, then the corresponding sub-volume is predicted to be empty and a second subset of contexts may be used for coding the bit $b_i$. If the predicted occupancy pattern bit $bP_i$ is non-zero, then the sub-volume is predicted to contain at least one point. In this example, the entropy coder 400 then assesses how many predicted points are found with the corresponding sub-volume. If the number of predicted points in the sub-volume does not exceed a preset threshold value, then the sub-volume is predicted to be occupied but sparsely populated and a third subset of contexts is used for coding. If the number of predicted points in the sub-volume exceeds the preset threshold value, then the sub-volume is predicted to be densely populated with points and a fourth subset of contexts is then used for selecting a context for coding $b_i$.

The preset threshold value may be set to any number that signals a densely populated sub-volume. Tuning of the preset threshold value may take place using test sequences to identify a value that best results in compression improvements through context selection for occupied sub-volumes.

In yet a further example implementation, the entropy coder 400 may have more than one preset threshold value against which the count of predicted points within the sub-volume is compared, and which is used as the basis for selecting a subset of contexts for coding the occupancy pattern bit $b_i$.

It will be appreciated that the present context selection process described in the above examples integrates well with other context selection processes, whether they involve neighbour configuration, previously-coded occupancy pattern bits, or context reduction operations.

Figure 16:
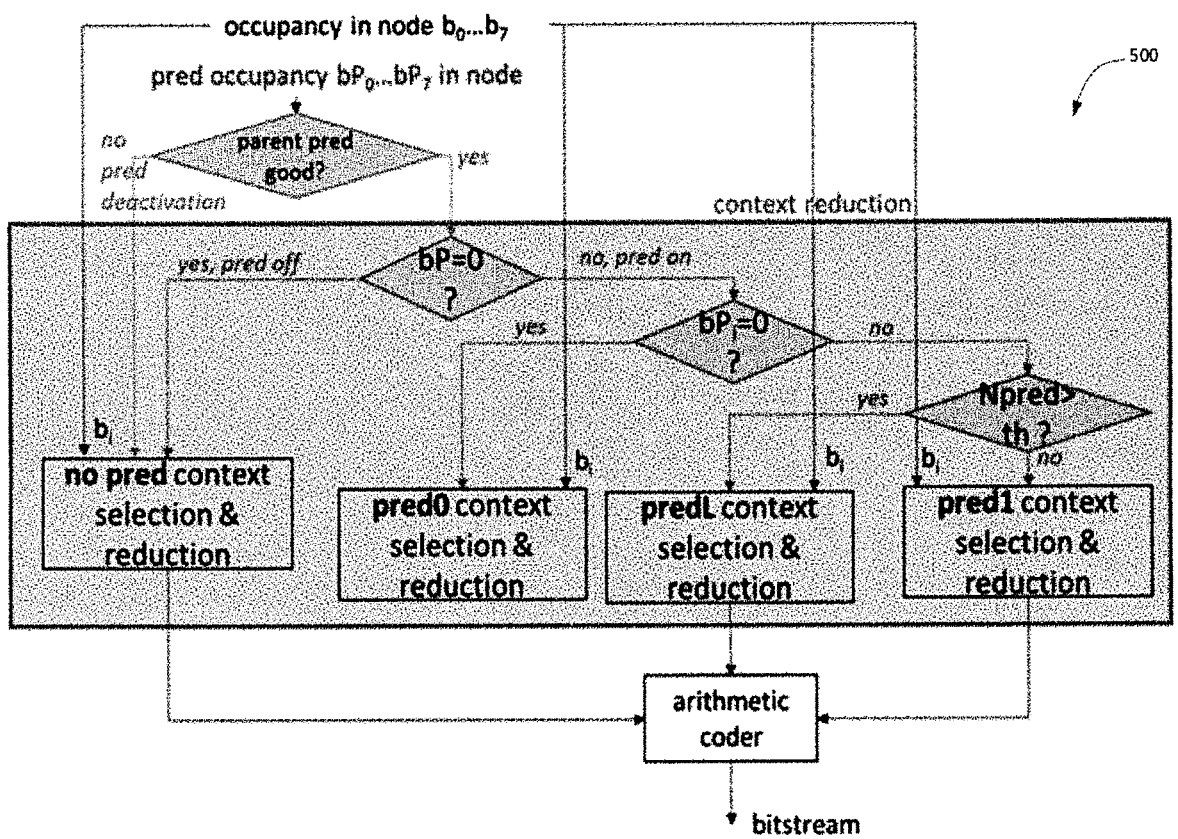
FIG. 16 shows a third example of part of a context-based entropy coder.

Reference is now made to FIG. 16, which shows a further example of part of a context-based entropy coder 500. The context-based entropy coder 500 uses the same process described above with regard to the second example context-based entropy coder 400, but in this case includes a conditional prediction deactivation operation. It may be that some regions of the point cloud are well predicted and some portions are poorly predicted. It may be possible to evaluate the likely prediction quality locally by looking at the quality that was realized for parent nodes, i.e. at a larger scale of coding. If the prediction turned out to be rather poor for a parent node, then the prediction for child nodes is also likely to be poor. On this basis, the entropy coder 500 may determine that prediction is not to be used for those child nodes.

A determination of the "quality" of a prediction may be made based the number of bits in an occupancy pattern that were incorrectly predicted, i.e. count how many sub-volumes were incorrectly predicted to be occupied or unoccupied. This count, $N_{wrong}$, may be determined as:

$$N_{wrong} = \#\{j | bP_j! = b_j\}$$

The count of incorrectly predicted sub-volumes is then compared to a set threshold $N_{bad}$ and the node will be deemed "poorly predicted" if $N_{wrong} \geq N_{bad}$. In one illustrative example based on octree partitioning, $N_{bad}$ may be set to 4, although it will be understood that it may be set to other values.

Accordingly, when starting the coding of an occupancy pattern $b_0, \ldots b_7$ for a volume/node, the entropy coder 500 first evaluates whether its parent volume/node was poorly predicted or not. If it was not poorly predicted, then the entropy coder 500 uses prediction-based context selection (subject to possibly disabling it if the predicted occupancy pattern is empty) in coding the current node's occupancy pattern.

It will be appreciated that the above examples of entropy coders each use the predicted occupancy pattern as the basis for context selection. Moreover, in some of the examples, the predicted occupancy pattern is used as the basis for context set selection for coding a bit $b_i$ of the occupancy pattern dependent on whether the corresponding predicted occupancy bit is non-zero. In some cases, the count of predicted points within a sub-volume is also used as the basis for context set selection or context selection.

Impact on Compression Performance

The use of 10 neighbour configurations and non-binary coding provides a compression gain over current implementations of the MPEG test model for point cloud coding. The use of 10 neighbour configurations with cascaded binary coding using 2550 contexts results in an even better improvement in compression efficiency. When using context reduction to reduce the total number of contexts to 576 the binary coding compression is still marginally better than implementation using non-binary coding, and much better than the test model.

The use of prediction in improving context selection shows a yet further significant improvement in compression efficiency. Using a moving vehicle point cloud, coding using context-reduced neighbour-based coding showed an average of about 9% compression improvement over the test model, whereas motion compensation using an implementation of the motion vector search process described above results in a 23% gain in compression efficiency over the test model. This may be compared to a motion compensation implementation with no search and using a motion vector V=0 (basing the prediction on a co-located sub-volume of a temporally-related point cloud) that provides a 13% improvement over the test model. With computer-graphics-based virtual-reality test point clouds, the improvement is more marked at over 50% for prediction-based coding involving a motion vector search.

Figure 17:
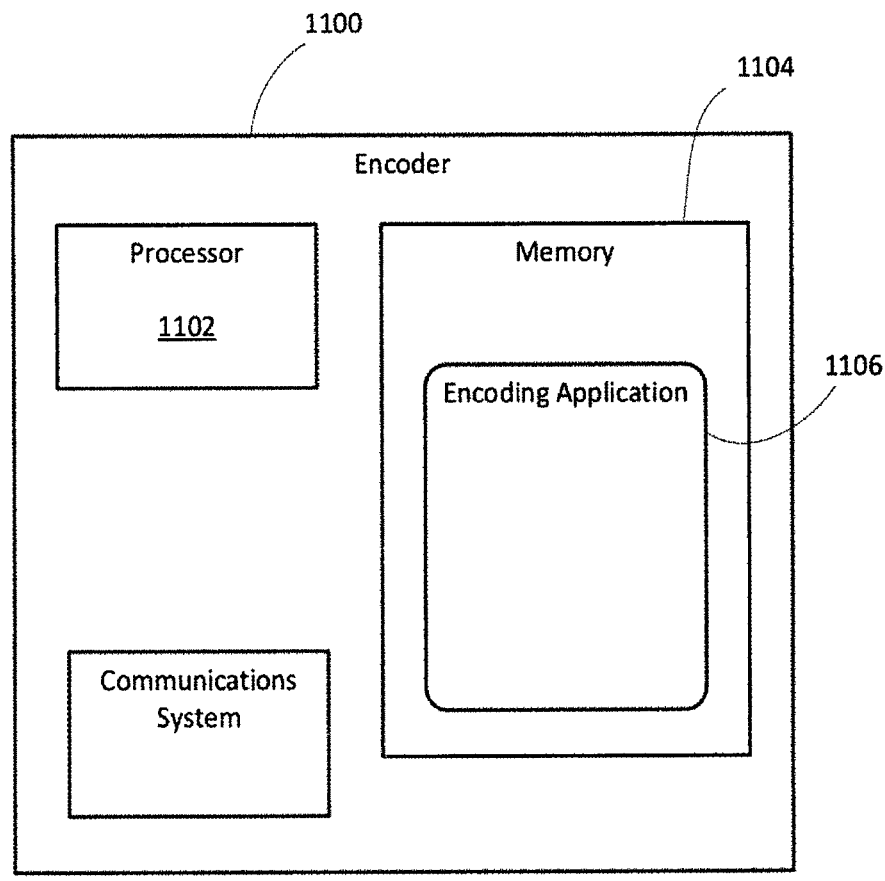
FIG. 17 shows an example simplified block diagram of an encoder.

Reference is now made to FIG. 17, which shows a simplified block diagram of an example embodiment of an encoder 1100. The encoder 1100 includes a processor 1102, memory 1104, and an encoding application 1106. The encoding application 1106 may include a computer program or application stored in memory 1104 and containing instructions that, when executed, cause the processor 1102 to perform operations such as those described herein. For example, the encoding application 1106 may encode and output bitstreams encoded in accordance with the processes described herein. It will be understood that the encoding application 1106 may be stored on a non-transitory computer-readable medium, such as a compact disc, flash memory device, random access memory, hard drive, etc. When the instructions are executed, the processor 1102 carries out the operations and functions specified in the instructions so as to operate as a special-purpose processor that implements the described process(es). Such a processor may be referred to as a "processor circuit" or "processor circuitry" in some examples.

Figure 18:
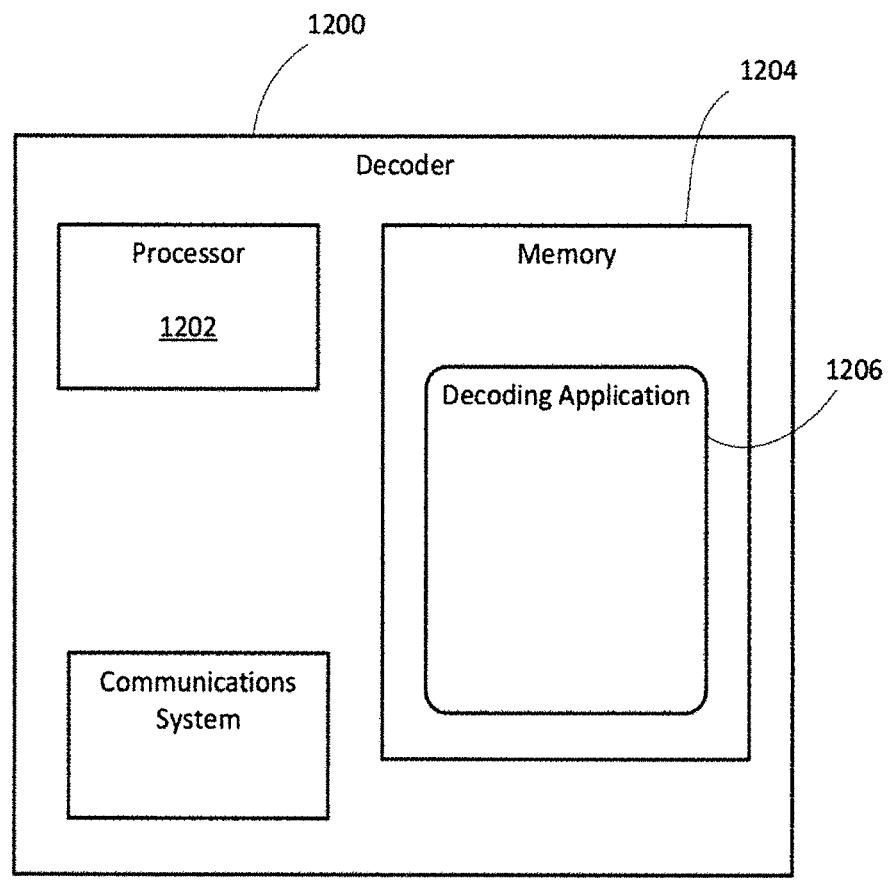
FIG. 18 shows an example simplified block diagram of a decoder.

Reference is now also made to FIG. 18, which shows a simplified block diagram of an example embodiment of a decoder 1200. The decoder 1200 includes a processor 1202, a memory 1204, and a decoding application 1206. The decoding application 1206 may include a computer program or application stored in memory 1204 and containing instructions that, when executed, cause the processor 1202 to perform operations such as those described herein. It will be understood that the decoding application 1206 may be stored on a computer-readable medium, such as a compact disc, flash memory device, random access memory, hard drive, etc. When the instructions are executed, the processor 1202 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive.

What is claimed is:

1. A method of encoding a point cloud to generate a bitstream of compressed point cloud data, the point cloud being located within a volumetric space containing the points of the point cloud, each of the points having a geometric location within the volumetric space, wherein a sub-volume within the volumetric space contains a set of points the locations of which are to-be-coded, the method comprising:
   determining a plurality of candidate coding modes, wherein each candidate coding mode transforms a set of previously-coded points into a candidate predicted set of points;
   selecting a coding mode from among the plurality of candidate coding modes using rate-distortion optimization, where the rate-distortion optimization includes, for one of the candidate coding modes, determining a geometric distortion between the set of points and the candidate predicted set of points produced by said one of the candidate coding modes, and wherein the geometric distortion is determined based on a sum of the absolute distance between each point in the set of points and a respective nearest predicted point in said candidate predicted set of points; and coding the set of points partly based on the predicted set of points determined by the selected coding mode, to generate the bitstream.

2. The method claimed in claim 1, wherein the coding mode includes a motion vector defining a translation of the set of previously-coded points to generate the candidate predicted set of points.

3. The method claimed in claim 1, wherein the geometric distortion is determined based on a sum of a non-linear function of the absolute distance between each point and its respective nearest predicted point in said candidate predicted set of points.

4. The method claimed in claim 1, wherein the geometric distortion is determined based on a sum of a logarithm of the absolute distance between each point and its respective nearest predicted point in said candidate predicted set of points.

5. The method claimed in claim 4, wherein the geometric distortion, D, is determined in accordance with the expression:

$$D = \sum_{\beta \in B} \log_2\left(1 + \min_{\varphi \in P}\|\beta - \varphi\|_1\right)$$

where B is the set of points in the volume, $\beta$ is a point in the set of points in the volume, P is the predicted set of points, and $\varphi$ is the respective nearest predicted point to the point $\beta$ in the set of points.

6. The method claimed in claim 1, wherein the respective nearest predicted point to each point in the set of points is determined by finding, for a particular point in the set of points, a predicted point in the set of predicted points that has an L1 distance from the particular point.

7. The method claimed in claim 1, wherein selecting a coding mode includes performing a multi-round iterative search for a locally-best coding mode within a search range, and wherein each successive round of the search includes determining two or more locally-best coding modes and defining successive new search ranges centered around respective points identified by said locally-best coding modes.

8. The method claimed in claim 7, wherein the multi-round search determining two or more locally-best coding modes includes calculating, for each candidate coding mode in a particular round, a rate-distortion expression that includes the geometric distortion attributable to that candidate coding mode, and identifying two or more locally least-cost coding modes for that particular round.

9. The method claimed in claim 1, wherein coding the set of points includes context-based entropy coding the set of points using context selection based, at least in part, on the predicted set of points.

10. The method claimed in claim 1, wherein the set of previously-coded points are previously-coded points from the point cloud located in a second volume positioned proximate the volume.

11. The method claimed in claim 1, wherein the set of previously-coded points are from a second point cloud temporally-related to the point cloud.

12. The method claimed in claim 1, wherein the volumetric space is recursively partitioned and one of the partitions is the sub-volume.

13. An encoder for encoding a point cloud to generate a bitstream of compressed point cloud data, the point cloud being located within a volumetric space recursively split into sub-volumes and containing the points of the point cloud, each of the points having a geometric location within the volumetric space, wherein a volume contains a set of points the locations of which are to-be-coded, the encoder comprising:

a processor;

memory; and an encoding application containing instructions executable by the processor that, when executed, cause the processor to:

determine a plurality of candidate coding modes, wherein each candidate coding mode transforms a set of previously-coded points into a candidate predicted set of points;

select a coding mode from among the plurality of candidate coding modes using rate-distortion optimization, where the rate-distortion optimization includes, for one of the candidate coding modes, determining a geometric distortion between the set of points and the candidate predicted set of points produced by said one of the candidate coding modes, and wherein the geometric distortion is determined based on a sum of the absolute distance between each point in the set of points and a respective nearest predicted point in said candidate predicted set of points; and code the set of points partly based on the predicted set of points determined by the selected coding mode, to generate the bitstream.

14. The encoder claimed in claim 13, wherein the coding mode includes a motion vector defining a translation of the set of previously-coded points to generate the candidate predicted set of points.

15. The encoder claimed in claim 13, wherein the geometric distortion is determined based on a sum of a non-linear function of the absolute distance between each point and its respective nearest predicted point in said candidate predicted set of points.

16. The encoder claimed in claim 13, wherein the geometric distortion is determined based on a sum of a logarithm of the absolute distance between each point and its respective nearest predicted point in said candidate predicted set of points.

17. The encoder claimed in claim 16, wherein the geometric distortion, D, is determined in accordance with the expression:

$$D = \sum_{\beta \in B} \log_2\left(1 + \min_{\varphi \in P}\|\beta - \varphi\|_1\right)$$

where B is the set of points in the volume, $\beta$ is a point in the set of points in the volume, P is the predicted set of points, and $\varphi$ is the respective nearest predicted point to the point $\beta$ in the set of points.

18. The encoder claimed in claim 13, wherein the respective nearest predicted point to each point in the set of points is determined by finding, for a particular point in the set of points, a predicted point in the set of predicted points that has an L1 distance from the particular point.

19. The encoder claimed in claim 13, wherein the instructions, when executed, are to cause the processor to select a coding mode by performing a multi-round iterative search for a locally-best coding mode within a search range, and wherein each successive round of the search includes determining two or more locally-best coding modes and defining successive new search ranges centered around respective points identified by said locally-best coding modes.

20. A non-transitory processor-readable medium storing processor-executable instructions for encoding a point cloud to generate a bitstream of compressed point cloud data, the point cloud being located within a volumetric space containing the points of the point cloud, each of the points having a geometric location within the volumetric space, wherein a sub-volume within the volumetric space contains a set of points the locations of which are to-be-coded, wherein the instructions, when executed by a processor, cause the processor to:

determine a plurality of candidate coding modes, wherein each candidate coding mode transforms a set of previously-coded points into a candidate predicted set of points;

select a coding mode from among the plurality of candidate coding modes using rate-distortion optimization, where the rate-distortion optimization includes, for one of the candidate coding modes, determining a geometric distortion between the set of points and the candidate predicted set of points produced by said one of the candidate coding modes, and wherein the geometric distortion is determined based on a sum of the absolute distance between each point in the set of points and a respective nearest predicted point in said candidate predicted set of points; and code the set of points partly based on the predicted set of points determined by the selected coding mode, to generate the bitstream.

* * * * *